Feb. 17, 1959  J. H. REEDER  2,873,548
TRIPPLE FISH HOOK
Filed Nov. 25, 1957
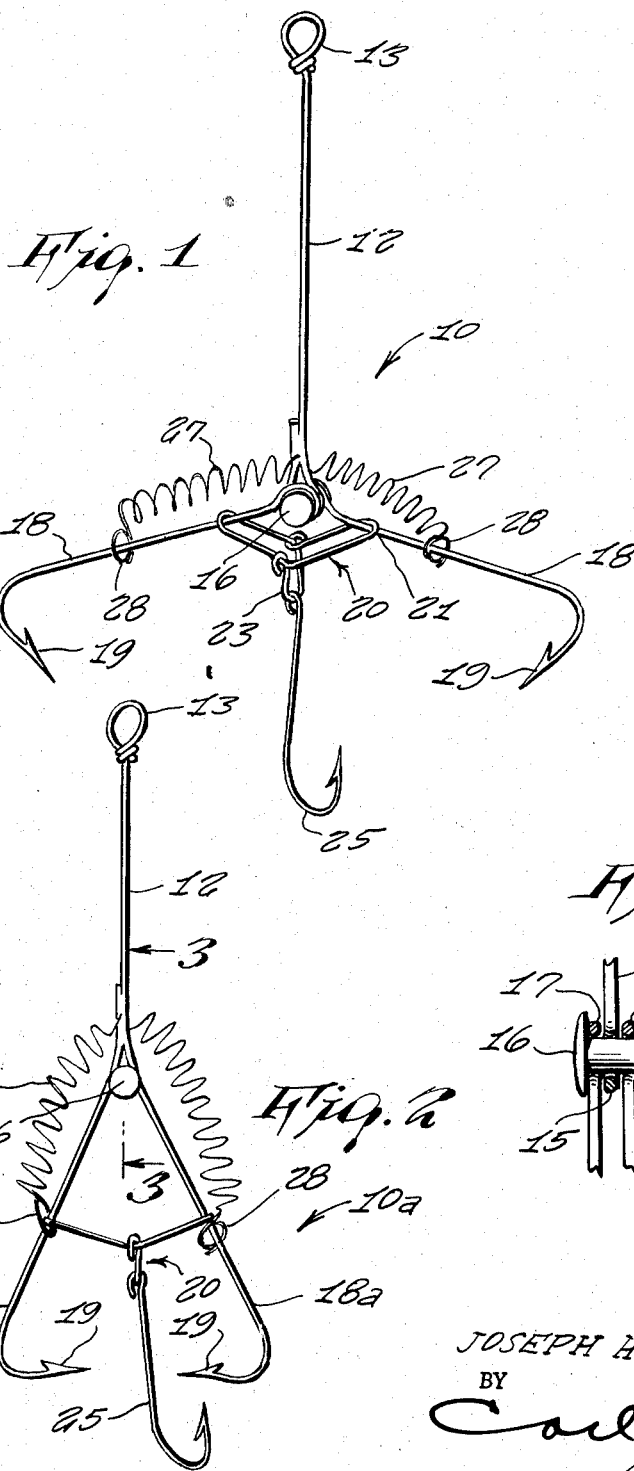
INVENTOR.
JOSEPH H. REEDER
BY
Carl Miller
ATTORNEY United States Patent Office 2,873,548
Patented Feb. 17, 1959

2,873,548

TRIPLE FISH HOOK

Joseph H. Reeder, Bayside, N. Y.

Application November 25, 1957, Serial No. 698,676

3 Claims. (Cl. 43—37)

This invention relates to trapping equipment and more particularly to a trap hook.

It frequently happens that in fishing and trapping, the animal becomes insecurely hooked upon the hook and is thus able to free itself. Accordingly, it is an object of the present invention to provide a trap hook that is simple in construction, efficient in operation, and which will positively secure the animal so as to prevent it from freeing itself therefrom.

Another object of the present invention is to provide a trap hook which will securely grasp both sides of the animal after the main hook has been jerked, thus providing a triple action.

Still another object of the present invention is to provide a trapping device of the type described which may be manufactured in large quantities at low cost and which is very readily manipulated for use.

All of the foregoing and still further objects and advantages of this invention will become apparent from a study of the following specification, taken in connection with the accompanying drawing, wherein:

Figure 1 is a perspective view of a triple action trap hook made in accordance with the present invention in an open position;

Figure 2 is a view similar to Figure 1, showing the parts in a closed position; and Figure 3 is an enlarged transverse cross sectional view taken along line 3—3 of Figure 2.

Referring now to the drawing, and more particularly to Figures 1 and 3 thereof, a triple action trap hook 10 made in accordance with the present invention is shown to include a main shank 12 having an eye 13 at one end for securement to a line. A similar eye 15 at the opposite end of the shank 12 rotatably supports a rivet 16 which, in turn, rotatably supports the eyes 17 at the outer ends of a pair of arms 18. The inner ends of the arms 18 are provided with barbs 19 which act as gaffs, as will be hereinafter described.

A slider yoke 20 constructed from a single length of formed wire having a pair of upwardly diverging shoulder loops 21 which are slidably carried upon the arms 18, is provided with a depending central portion in the form of a dropped loop 23 for pivotally supporting the upper end of a main hook 25. A pair of tension springs 27 are each secured at one end to the shank 12, while the opposite ends thereof are provided with rings 28 which slidably engage the arms 18. It will be noted that the shoulder loops 21 of the slider yoke 20 are carried intermediate the pivotally connected ends of the arms 18 and the slidably supported rings 28 of the springs.

In actual use, the device 10 is disposed with the parts in the position shown in Figure 1. In response to a fish or other animal biting or pulling upon the main hook 25, the longitudinal movement of the slider yoke 20 draws the outwardly diverging arms 18 of the gaffs 19 toward each other to the adjusted position 18a shown in Figure 2. With the device in the closed position 10a, as shown, the gaffs 19 are drawn into the sides of the animal, such that the harder the pull is upon the main hook 25, the greater is the force which drives the barbs 19 into the animal. The rings 28 limit the downward movement of the slider yoke and main hook 25, and also resiliently retain the barbs 19 in the inoperative position shown in Figure 1 until the main hook 25 is pulled. It thus becomes a simple matter to dislodge the triple action hook from one animal to ready it for use thereafter, no resetting or rearrangement of parts being necessary. As soon as the pull upon the hook 25 is relieved, the barbs 19 automatically spring back to the normally open position shown in Figure 1. Because of the one piece construction of the slider yoke 20, the parts are effectively secured together against accidental displacement which might otherwise free the animal.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A triple action trap hook comprising, in combination, a rigid main shank having means at one end for securement to the end of a flexible line, a pair of arms rotatably supported each at one end upon the opposite end of said main shank from said line securing end, a yoke supported slidably upon said arms, a main hook, means supporting said hook upon said yoke intermediate said arms, spring means secured at one end to said main shank and at the opposite end to said arms normally urging said arms in a direction away from said main hook, said arms being rotatable between an open position substantially perpendicular to said main shank and a closed position substantially parallel thereto, said spring means comprising a pair of tension coil springs, said one end of each of said tension coil springs being secured to said shank, and the opposite end of said tension coil spring comprising a ring slidably receiving said respective arms.

2. A trap hook as set forth in claim 1, wherein said yoke is slidably supported upon said arms intermediate said rotatably supported end of said arms and said rings of said springs.

3. A trap hook as set forth in claim 2, wherein said yoke comprises a depending central portion for pivotally supporting said main hook.

References Cited in the file of this patent

UNITED STATES PATENTS

| 2,120,863 | Johnson | June 14, 1938 |
| 2,620,590 | Shaw | Dec. 9, 1952 |

FOREIGN PATENTS

| 7,708 | Great Britain | Apr. 7, 1908 |